Figure 1:
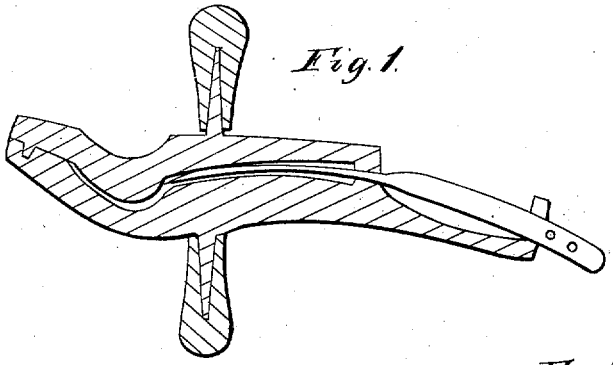
Figure 3:
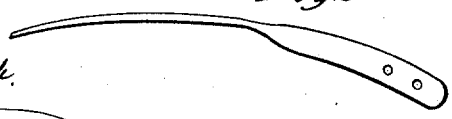
Figure 4:
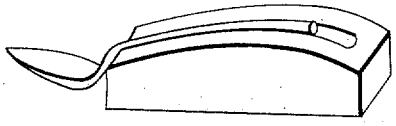
Figure 2:
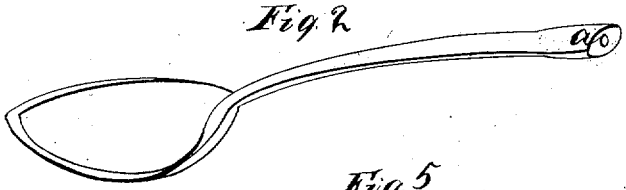
Figure 5:
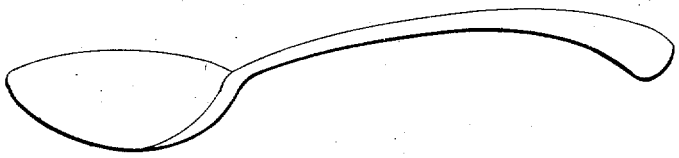

W. Mix,

Spoon.

N° 480. Reissued Aug. 4, 1857.

N. PETERS, PHOTO-LITHOGRAPHER, WASHINGTON, D. C.

UNITED STATES PATENT OFFICE.

WILLIAM MIX, OF MERIDEN, CONNECTICUT, ASSIGNOR TO CHARLES PARKER, OF SAME PLACE.

IMPROVED METHOD OF MAKING WIRE-STRENGTHENED SPOONS.

Specification forming part of Letters Patent No. 6,413, dated May 1, 1849; Reissue No. 180, dated August 4, 1857.

*To all whom it may concern:*

Be it known that I, WILLIAM MIX, of Meriden, in the county of New Haven and State of Connecticut, have invented an Improved Method of Making Wire-Strengthened Spoons, of which the following is a specification.

Previous to my invention britannia or similar soft-metal spoons were made either by casting the spoon completely shaped wholly of the one kind of metal, or, secondly, by casting it also completely shaped, with a wire of iron or other hard metal in the handle for adding to its strength, or, thirdly, in the manner invented by me, and patented on the 23d May, 1848, and in which the strengthening-wire was inserted in a peculiar manner—viz., by first casting a portion of the handle hollow by means of a draw-tap, so that the removal of the tap left a hole for the insertion of the strengthening-wire, and the spoon was then finished by shaping the handle with a drop and dies. This, although a decided improvement over the old modes, in that it secured a firmer and more substantial handle, was yet defective, in that the mold would often be imperfectly filled, thus leaving cavities which resulted in considerable loss, the object sought being twofold—viz., the insertion of as large a wire as possible, and from which will result, first, increased strength, and, secondly, a saving of stock in the more valuable metal.

The nature of my present improvement consists in casting the handle over the wire with a considerable excess of metal, so that it will be larger than the finished article, and then swaging it to the required shape by a drop-press and dies, whereby, in the first place, the filling of the mold will be rendered more certain, and, secondly, even if not perfectly full, the subsequent operation of the dies will insure the filling out in every direction, while at the same time the metal will be condensed and made as solid as possible upon the strengthening-wire. To accomplish this the spoon-handle may, if preferred, be cast upon a draw-tap, as described in my before-mentioned patent, though this is not essential, since it may also be cast upon the actual wire intended to remain in the handle. In either case I prefer to cast the handle straight, or nearly so, the mold being of a size to form a casting larger than is required for the finished spoon, as already mentioned. Into this the metal is to be poured, and, after having set, the draw-tap is to be removed and the intended strengthening-wire inserted; but, if cast upon the strengthening-wire itself, that wire must be supported upon bearers to keep it in a central position. The spoon is now swaged or formed into its finished shape by a drop and dies. By this means the metal is condensed and rendered more compact and solid, as well as being more firmly closed upon the strengthening-wire. An excess of metal being present, the die is certain to be filled even if there should have been cavities left in the casting. The said excess is driven out at the sides as the dies close upon it, the quantity of metal used being reduced to the least possible, and which reduction, as before mentioned, has the double advantage of economizing in the more expensive material, and at the same time of affording increased strength and stiffness, for the reason that a larger wire may thus be employed.

In the drawings the spoon is represented as being cast with the draw-tap arrangement, Figure I being a sectional view of the mold; Fig. III, the wire forming the core or tap; Fig. IV, a perspective view of one-half of the mold; Fig. II, a spoon as it is cast ready to receive the wire, with the handle shown enlarged, as at *a'*; and Fig. V, the finished spoon. The spoons are finally finished by trimming off the burr caused by squeezing out the excess of metal, and then it is burnished or buffed, as usual.

I claim, therefore, as my improvement—

Casting the spoon-handle in a mold of larger dimension than the finished handle is required to be, as herein set forth, and subsequently swaging the handle into the proper shape, and condensing the metal upon the strengthening-wire by means of the drop-press and dies, as described.

In witness whereof I have hereunto subscribed my name.

CHAS. PARKER.

In presence of—

JOHN W. MILES,
WM. COCHRAN.